Aug. 13, 1957 — E. R. WEATHERLY — 2,802,573
CONTACTING APPARATUS
Filed Feb. 23, 1954 — 2 Sheets-Sheet 1

INVENTOR.
EARL R. WEATHERLY
BY
ATTORNEYS

Aug. 13, 1957 E. R. WEATHERLY 2,802,573
CONTACTING APPARATUS
Filed Feb. 23, 1954 2 Sheets-Sheet 2

INVENTOR.
EARL R. WEATHERLY
BY
ATTORNEYS

United States Patent Office 2,802,573
Patented Aug. 13, 1957

2,802,573

CONTACTING APPARATUS

Earl R. Weatherly, Media, Pa., assignor to Sun Oil Company, Philadelphia, Pa., a corporation of New Jersey Application February 23, 1954, Serial No. 411,656

5 Claims. (Cl. 210—289)

This invention relates to apparatus for contacting fluids with a mass of granular contact material and is particularly directed to contacting apparatus adapted to provide for uniform distribution of the fluid being fed into the contact mass.

Processes involving operations in which a fluid mixture is fed into a bed of a granular adsorbent for the purpose of selectively removing one or more of the constituents of the mixture are known. In some processes of this kind, the removed constituents are then recovered from the contact mass by passing another fluid through the bed to displace or desorb the constituents previously retained by the adsorbent.

Exemplary of this type of operation are known processes for separating organic liquids by means of selective adsorbents such as silica gel, activated carbon and the like. The separations of aromatics or olefins from hydrocarbon liquids containing the same in admixture with saturate hydrocarbons are specific illustrations of such processes. Hydrocarbon separations conducted in this manner are described in Lipkin Reissue Patent No. 23,005, Lipkin Patent Nos. 2,449,402 and 2,459,442, and Hirschler et al. Patent No. 2,441,572. A process of this kind known as the "Arosorb Process" has been described in "Petroleum Refiner," vol. 31, No. 5, pps. 109–113, May 1952 and in "Chemical Engineering Progress," vol. 48, No. 6, pps. 276–280, June 1952. These processes involve a cyclic operation in each cycle of which a quantity of unsaturate-containing feed stock is introduced in liquid phase into a bed of adsorbent to selectively adsorb the unsaturates, immediately following which a suitable desorbing liquid is passed through the bed to desorb the unsaturates. The cycle is then repeated by passing a further quantity of feed stock into the adsorbent as soon as the introduction of desorbing agent in the previous cycle has been stopped, and following it with additional desorbing agent. In each cycle the efflux stream from the adsorber is cut into suitable fractions which are rich in saturate and unsaturate hydrocarbons respectively. The desorbing agent may be removed from the fractions by distillation and re-used.

A difficulty in practicing processes of the foregoing type arises due to maldistribution of the liquids fed into the adsorbent bed. In order to effect a sharp separation between the constituents of the charge mixture it is important that each liquid be fed uniformly over the surface of the bed so that it will enter it at the same rate throughout and progress evenly through the mass. If such uniform distribution is not established, proper segregation of the desired efflux fractions cannot be effected, with the result that the unsaturate and saturate products will be of low purity. The customary practice of merely introducing the charge and desorbent liquids into the adsorber through a central inlet line results in such maldistribution, particularly when the adsorber is of relatively large diameter. This condition can be alleviated somewhat by providing a plurality of spaced inlet lines, but use of the multiplicity of lines that would be required for a large sized commercial adsorber is not practicable.

Conventional filtration devices are unsatisfactory for practicing the type of operation above referred to not only because of uneven flow of the successively introduced liquids through the adsorbent but also because there is generally substantial mixing of the liquids at the inlet end of the apparatus as each liquid follows the other. Such mixing has an adverse effect on the efficiency of separation in the process.

The present invention provides improved adsorption-desorption apparatus adapted to permit sharp separation between the charge constituents in a cyclic operation in which a charge liquid and a liquid desorbent are successively introduced. Apparatus according to the invention includes means at the inlet end of the adsorber for distributing the introduced liquid over the surface of the adsorbent bed and feeding it therein at a substantially uniform rate at all points. This is done by providing a perforated plate extending across the inlet end of the adsorber and spaced a short distance inwardly from the end so as to provide a narrow space to which the liquid is first fed. The width of this space is within the range of ¼ inch to 2.0 inches, which narrow spacing precludes substantial mixing of the successively introduced liquids. This width is only a small fraction, generally considerably less than one one-hundredth, of the maximum diameter of the adsorber. The plate has a multiplicity of perforations located throughout its exposed face area, the number and size of perforations being such that the fraction of perforated area is only 0.1% to 1.0% of the exposed face area and such that the fluid pressure drop through the perforations is greater than the maximum fluid pressure drop from the inlet line or lines to the perforations. This causes the fluid to flow from the narrow space to which it is first fed through each of the perforations at about the same rate and thus to enter the surface of the adsorbent uniformly and progress evenly through the mass.

An embodiment of the invention is described with reference to the accompanying drawings in which.

Figure 1:
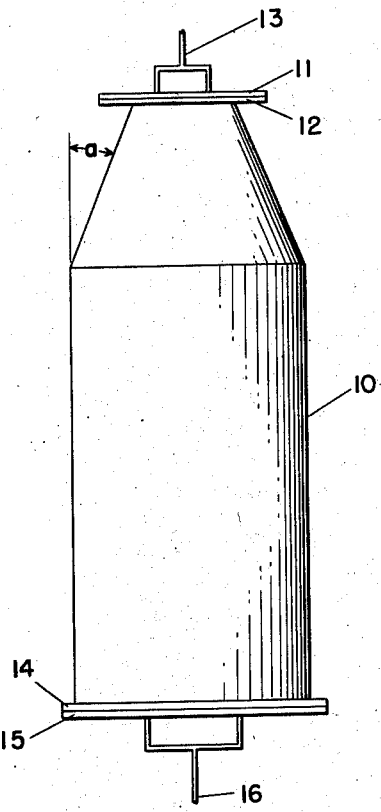
Fig. 1 is an elevational view of an adsorber having a tapered inlet end.

With reference to the drawings, Fig. 1 illustrates an adsorber comprising a vertically positioned casing 10 adapted for downward flow of the charge and desorbent through a bed of granular adsorbent contained within the casing. The inlet end of casing 10 is closed by means of flange members 11 and 12 and is connected to one or more fluid inlet lines diagrammatically illustrated at 13. The lower end of the casing is closed by means of flange members 14 and 15 and communicates with one or more outlet lines shown diagrammatically at 16.

The inlet end of casing 10 preferably is tapered so as to decrease the size and thereby simplify construction of the fluid distributing means and also to minimize the amount of fluid mixing that can occur at the distributing zone. This feature is particularly advantageous for large size commercial adsorbers. The angle "a" of taper generally should be within the range of 20–50° and more preferably about 30°. Such tapering allows the incoming fluid to be distributed over a smaller surface of adsorbent and still permits an even flow of the fluid downwardly through the adsorbent mass.

Figure 2:
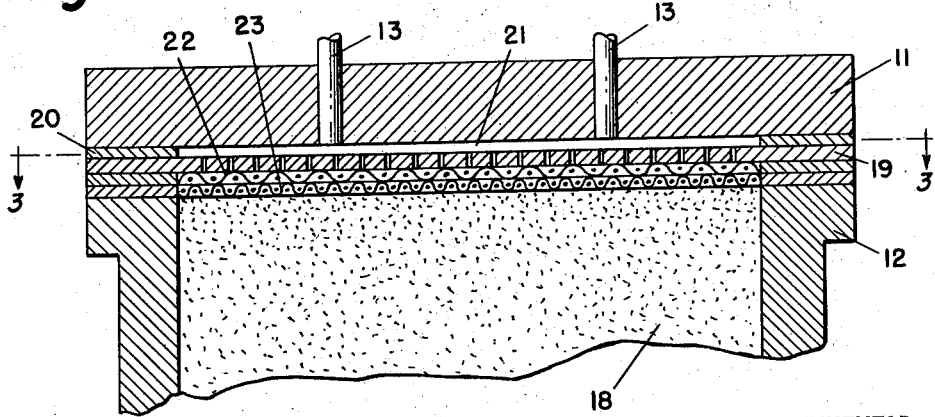
Fig. 2 is a vertical cross-sectional view of the inlet end.
Figure 3:
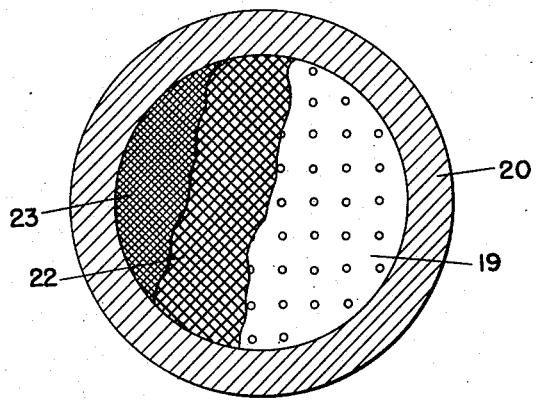
Fig. 3 is a view generally on the line 3—3 of Fig. 2 with portions broken away to show details.

Figs. 2 and 3 show details of the means utilized for properly distributing the incoming fluid over the surface of the adsorbent bed 18. A plate 19 having a multiplicity of uniformly spaced perforations is provided between flange members 11 and 12 and is positioned a predetermined distance of from ¼ inch to 2.0 inches from flange member 11 by means of spacer ring 20. This provides a narrow space 21 of ¼–2.0 inch height just above the perforated plate to which the charge and desorbent fluids are first fed by means of inlet lines 13. In order to secure proper distribution into the adsorbent it is important that the size and number of perforations in plate 19 be such that the fraction of perforated area lies within the range of 0.1–1.0% of the exposed face area of plate 19 and such that the fluid pressure drop through the perforations is greater than the maximum fluid pressure drop through space 21. In other words the pressure drop from the lower end of any of the inlet lines 13 to the most remote perforation fed from such line should be less than the pressure drop through the plate perforations. This insures substantially uniform flow through all of the perforations and thus distributes the liquid over the surface of adsorbent 18. The width of space 21 should be at least ¼ inch to avoid inordinately high pressure drops but preferably as much less than two inches as possible consistent with establishing pressure drops as specified above. The narrowness of space 21 minimizes mixing of charge and desorbent as one follows the other during an operating cycle. In commercial practice the width of space 21 desirably may be of about ⅜ inch to ½ inch for best operation, while the maximum diameter of casing 10 typically may be within the range of 6–12 feet.

It is preferred to provide immediately beneath perforated plate 19 some means for permitting fluid flow between the perforations so that the entire surface of adsorbent 18 will be covered by a thin layer of fluid. Such means is illustrated in Fig. 2 as a relatively coarse screen 22 positioned immediately adjacent plate 19. While this is not essential if plate 19 contains a large number of perforations narrowly spaced from each other, it constitutes a preferred construction for a commercial adsorber. Beneath the coarse screen 22 a relatively fine screen 23 is provided for maintaining the adsorbent particles out of contact with the perforations. Casing 10 is packed with sufficient adsorbent 18 to insure that the bed abuts against screen 23 so that there will be no space beneath screen 23 in which mixing of the successive fluids can occur.

Figure 4:
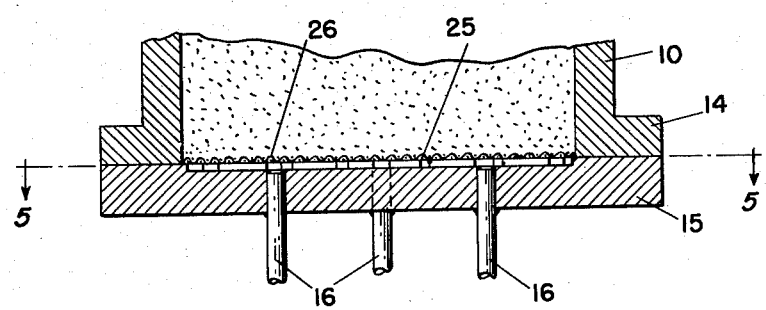
Fig. 4 is a vertical cross-sectional view of the outlet end of the adsorber.
Figure 5:
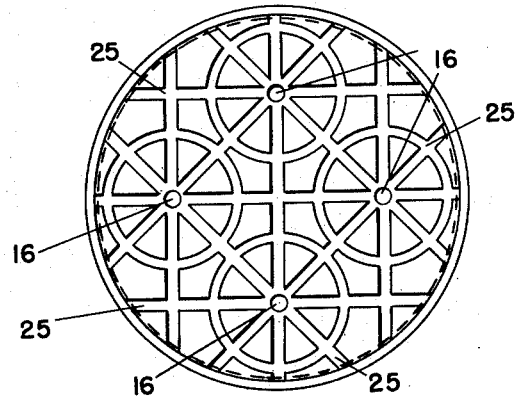
Fig. 5 is a view on the line 5—5 of Fig. 4.

Figs. 4 and 5 show details of a preferred construction for the outlet end of the adsorber. Lower flange member 15 connects with a plurality of spaced outlet conduits 16 through which the efflux from the adsorbent bed is withdrawn. The inner side of flange member 15 contains a network of grooves, indicated as 25, which communicate with the several outlets 16. A screen 26 adapted to support the adsorbent bed and prevent particles from entering the grooves is welded or otherwise secured to flange member 15. This construction allows the effluent to pass out of the adsorbent bed with minimum lateral flow in the bottom part of the bed and avoids fluid mixing which otherwise might decrease the sharpness of separation of the charge constituents.

The following dimensions are set forth as one specific illustration of an adsorber construction suitable for commercial practice in accordance with the invention. The casing 10 has a diameter of ten feet and is tapered at an angle of 30° toward the inlet end to an inlet diameter of about six feet. The spacing between perforated plate 19 and flange 11 is ⅜″, which spacing is equivalent to only about 1/320 of the maximum width of the adsorber. The perforated plate contains 320 holes of 5/32″ diameter each, corresponding to a fraction perforated area of the exposed plate face of about 0.15%. Four inlet lines 13, equally spaced apart, are provided for introduction of the charge and desorbent liquids. This construction is such that the maximum pressure drop through the space 21 is less than the pressure drop through the plate perforations. Immediately adjacent the inner side of the perforated plate is a screen of ¼″ mesh which permits the fluid flowing from the perforations to distribute itself over the adsorbent bed as a thin layer, and adjacent to the ¼″ screen is a 100 mesh screen which confines the adsorbent to the space beneath it.

The foregoing description constitutes an illustrative embodiment and various modifications may be made without departing from the scope of the invention. For example, instead of using spacer ring 20 to secure the desired spacing between the perforated plate and the end flange member, the latter may be recessed on its inner side to provide circumferential shoulders which serve as the spacer. Again, if the fluid flow is to be in an upward direction, the lower end of the adsorber should be provided with distributing means and the upper end with outlet means as described. In the event that it is desired to provide for more flexibility so that the adsorber may be operated with either upward or downward flow, each of its ends should contain the described distributing means. It is preferred, however, to have the outlet end, whether it be at the top or bottom, constructed in the manner described and without taper to minimize fluid mixing tending to decrease the sharpness of separation between the charge components.

This application is a continuation-in-part of my co-pending application Serial No. 212,075, filed February 21, 1951, now abandoned.

I claim:

1. Apparatus for separating organic liquids by successively passing a liquid charge mixture and a desorbing liquid into a granular adsorbent, which comprises a casing adapted to house a bed of such adsorbent and having inlet and outlet ends, said casing being cylindrical throughout at least a major portion of its length, a closure plate at said inlet end, a perforated plate in spaced relation with said closure plate and extending across the casing inlet, means for introducing said liquids into the space between said closure plate and said perforated plate, a screen adjacent the inner side of said perforated plate adapted to maintain the adsorbent particles out of contact with the perforations and means for withdrawing liquid from the outlet end of the casing; said apparatus being characterized by the facts that the closure plate and the perforated plate present opposed parallel plane faces separated by a distance of ¼ inch to two inches and less than one one-hundredth of the diameter of the casing cylinder and that said perforated plate has, throughout its exposed face area, a multiplicity of perforations of substantially uniform size, substantially evenly spaced between the center of the plate and its periphery, and substantially evenly spaced from each other, said perforations being of size such that the perforated area constitutes such small fraction, within the range of 0.1% to 1.0%, of the exposed face area of the plate that the fluid pressure drop through the plate perforations is greater than the maximum fluid pressure drop from said fluid introduction means to said perforations.

2. Apparatus according to claim 1 wherein said casing is tapered for a minor portion of its length at an angle of 20–50° with respect to the longitudinal axis of the casing to provide increasing cross-sectional bed area in the direction of flow.

3. Apparatus according to claim 1 including a flat closure member at said outlet end, a plurality of spaced outlet conduits connecting with said closure member, said closure member having a network of inner grooves communicating with said outlet conduits, and screen means adjacent the inner side of said closure member for preventing adsorbent particles from entering said grooves.

4. Apparatus for effecting separation of a charge mixture by means of a granular adsorbent which comprises a casing which is cylindrical throughout at least a major portion of its length and adapted to house a bed of granular adsorbent and having inlet and outlet ends, said casing being tapered adjacent its inlet for a minor portion of its length at an angle of 20-50° with the vertical to provide increasing cross-sectional bed area in the direction of flow, a flat closure member secured to said inlet end, a perforated plate positioned parallel to and from ¼ inch to two inches from said closure member and extending across the casing inlet, means for introducing fluid into the space between said closure member and said perforated plate, said plate having a multiplicity of perforations of substantially uniform size, substantially evenly spaced between the center of the plate and its periphery, and substantially evenly spaced from each other, said perforations being of size such that the perforated area constitutes such small fraction, within the range of 0.1% to 1.0%, of the exposed face area of the plate that the fluid pressure drop through the plate perforations is greater than the maximum fluid pressure drop from said introduction means to said perforations, a screen adjacent the inner side of said perforated plate, adjacent said screen a second screen of finer mesh than the first-named screen and adapted to retain the granular adsorbent, a flat closure member secured to said outlet end, a plurality of spaced outlet conduits connecting with said outlet end closure member, said outlet end closure member having a network of grooves on its inner side communicating with the outlets, and screen means adjacent the inner side of said closure member for preventing adsorbent particles from entering said grooves.

5. Apparatus for separating organic liquids by successively passing a liquid charge mixture and a desorbing liquid into a granular adsorbent, which comprises a casing adapted to house a bed of such adsorbent and having inlet and outlet ends, said casing being cylindrical throughout at least a major portion of its length, a closure plate at said inlet end, a perforated plate in spaced relation with said closure plate and extending across the casing inlet, means for introducing said liquids into the space between said closure plate and said perforated plate, a screen adjacent the inner side of said perforated plate adapted to maintain the adsorbent particles out of contact with the perforations and means for withdrawing liquid from the outlet end of the casing; said apparatus being characterized by the facts that the closure plate and the perforated plate present opposed parallel plane faces separated by a distance between ¼ inch and two inches and less than one one-hundredth of the diameter of the casing cylinder and that said perforated plate has throughout its face area a multiplicity of perforations of substantially uniform size, substantially evenly spaced of substantially uniform size, substantially evenly spaced between the center of the plate and its periphery, and substantially evenly spaced from each other, said perforations being of size such that the perforated area constitutes about 0.15% of the exposed face area of the plate and such that the fluid pressure drop through the plate perforations is greater than the maximum fluid pressure drop from said fluid introduction means to said perforations.

References Cited in the file of this patent
UNITED STATES PATENTS

| | | |
|---|---|---|
| 135,057 | Ackerman | Jan. 21, 1873 |
| 433,710 | Aims | Aug. 5, 1890 |
| 690,333 | Wanner | Dec. 31, 1901 |
| 1,595,344 | Lomax | Aug. 10, 1926 |
| 2,079,100 | Begg | May 4, 1937 |
| 2,264,722 | Sauer | Dec. 2, 1941 |
| 2,266,368 | Hull et al. | Dec. 16, 1941 |
| 2,341,429 | Elsey | Feb. 8, 1944 |
| 2,473,986 | Booth | June 21, 1949 |
| 2,477,404 | Butt | July 26, 1949 |
| 2,487,574 | Meng | Nov. 8, 1949 |

FOREIGN PATENTS

| | | |
|---|---|---|
| 318,173 | Great Britain | June 5, 1930 |
| 544,957 | Germany | Feb. 24, 1932 |

OTHER REFERENCES

Williams et al.: "Chromatography," Chem. Engr., November 1948, pp. 133-138.